United States Patent
Roy (10) Patent No.: US 9,206,485 B2
(45) Date of Patent: Dec. 8, 2015

(54) PORTABLE SUGAR MILL

(76) Inventor: J. Edwin Roy, Lafayette, LA (US)

( * ) Notice: Subject to any disclaimer, the term of this patent is extended or adjusted under 35 U.S.C. 154(b) by 0 days.

(21) Appl. No.: 13/587,857

(22) Filed: Aug. 16, 2012

(65) Prior Publication Data
US 2013/0042858 A1 Feb. 21, 2013

Related U.S. Application Data

(60) Provisional application No. 61/575,284, filed on Aug. 19, 2011.

(51) Int. Cl.
| | | |
|---|---|---|
| *C13B 30/06* | (2011.01) | |
| *C13B 10/12* | (2011.01) | |
| *C13B 30/02* | (2011.01) | |
| *B01D 21/34* | (2006.01) | |
| *B01D 9/00* | (2006.01) | |
| *B01D 21/26* | (2006.01) | |

(52) U.S. Cl.
CPC .............. *C13B 30/06* (2013.01); *B01D 9/0018* (2013.01); *B01D 9/0059* (2013.01); *B01D 21/26* (2013.01); *B01D 21/34* (2013.01); *C13B 10/12* (2013.01); *C13B 30/02* (2013.01)

(58) Field of Classification Search
CPC .. B01D 17/02; B01D 17/0208; B01D 17/042; B01D 17/044; B01D 17/047; B01D 17/12; B01D 9/00; B01D 9/0018; B01D 9/0059; B01D 21/00; B01D 21/0002; B01D 21/009; B01D 21/30; B01D 21/32; B01D 36/04; B01D 37/00; B01D 21/26; B01D 21/03; C10G 29/06; C10G 29/20; C10G 29/22; C10G 3/40; C10G 3/42; C10G 2300/308; C10G 2300/1011; C13B 20/16; C13B 30/02; C13B 30/002; C13B 30/022; C13B 2009/0086; C13B 10/12; C13B 30/064
USPC ......... 210/143, 149, 175, 182, 187, 241, 259, 210/787, 804, 806
See application file for complete search history.

(56) References Cited

U.S. PATENT DOCUMENTS

| | | | | |
|---|---|---|---|---|
| 3,424,611 | A * | 1/1969 | Miller | 127/2 |
| 3,939,005 | A | 2/1976 | White | |
| 4,056,364 | A * | 11/1977 | Dmitrovsky et al. | 422/253 |
| 4,155,774 | A * | 5/1979 | Randolph | 127/60 |
| 4,263,010 | A * | 4/1981 | Randolph | 23/295 R |
| 4,526,621 | A * | 7/1985 | Fields et al. | 127/1 |
| 6,355,110 | B1 * | 3/2002 | Donovan et al. | 127/55 |
| 6,663,780 | B2 * | 12/2003 | Heikkila et al. | 210/659 |
| 7,150,793 | B2 | 12/2006 | Sanders | |
| 7,763,116 | B2 * | 7/2010 | Carter et al. | 127/46.1 |

(Continued)

FOREIGN PATENT DOCUMENTS

WO WO 01/45523 6/2001

*Primary Examiner* — Joseph Drodge
(74) *Attorney, Agent, or Firm* — Richard C. Litman (57) ABSTRACT

The portable sugar mill is established on a mobile platform for transport to the harvesting field, so that the juice of the harvested sugar cane may be processed and refined in the field. The portable sugar mill converts the juice, which contains sucrose, into raw sugar crystals (brown sugar) and molasses. The portable sugar mill includes a separator tank, a pre-heating tank, a clarifier, and three successive stages of evaporative crystallization and separation of crystals from syrup. The portable sugar mill has a programmable logic controller and a plurality of sensors, control relays, pumps, motors, heaters, and valves that operate automatically under direction of the programmable logic controller.

11 Claims, 7 Drawing Sheets

(56) References Cited

U.S. PATENT DOCUMENTS 7,918,160 B2   4/2011  Roy
7,959,736 B2   6/2011  Cullinger
2001/0002037 A1   5/2001  Cullinger
2004/0231663 A1*  11/2004  Carter et al. .................... 127/61

* cited by examiner

PORTABLE SUGAR MILL

CROSS-REFERENCE TO RELATED APPLICATIONS

This application claims the benefit of U.S. Provisional Patent Application Ser. No. 61/575,284, filed Aug. 19, 2011.

BACKGROUND OF THE INVENTION

1. Field of the Invention

The present invention relates to sugar mills, and more specifically to a portable sugar mill for in-field processing of cane juice to brown sugar and molasses.

2. Description of the Related Art

Sugar is one of the most basic ingredients present in the kitchens of most homes. It imparts the sweet flavor that many enjoy from drinks, candy, and desserts to savory dishes. One of the most common types of sugars consumed by the general public is sucrose, derived from sugar cane.

One of the biggest concerns with the above is the potential loss of raw material for juice extraction, i.e., not the sugar cane itself but the contents therein. Sugar cane, once cut, must be expeditiously transported to the processing plant because the cut cane begins to lose its sugar content. This issue is exasperated by the damage inflicted on the cane during mechanical harvesting since it accelerates the decay. Although my cane juice extractor, described in U.S. Pat. No. 7,918,160, issued Apr. 5, 2011, is capable of pressing juice from the cane stalks, the issue still remains that the cane juice must be transported to a sugar processing plant, which consumes time, energy, and resources from various entities.

The cane grower and harvest must exhaust time and resources in harvesting, and juicing the cane stalks, yet he must then contain the extracted juice and transport the juice to a processing plant or mill. Governmental entities must burden resources for road maintenance and services to the transportation vehicles, as well as establishing transportation laws and guidelines that allow the safe transport of the juice, as well as providing safety for everyone using the transportation system infrastructures. The plant or mill must utilize resources for maintaining and operating facilities, as well as provide processing services for the juice providers.

Thus, a portable sugar mill solving the aforementioned problems is desired.

SUMMARY OF THE INVENTION

The portable sugar mill is a mobile processing plant that converts the juices extracted from sugar cane into brown sugar and molasses in the field, without the necessity of transporting either the raw sugar cane or the extracted juices to a stationary mill for processing. The portable sugar mill is an all-electric unit that can be mounted on an 8'×42' flat-bed truck. The truck includes a flat-bed frame and a forward deck. The forward deck includes a power source for the portable sugar mill processes. The flat-bed frame has an inlet side where extracted cane juice may be fed. The power source of the forward deck also includes a controller/generator connected to a fuel source.

These and other features of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

The portable sugar mill is a mobile processing plant that converts the juices extracted from sugar cane into brown sugar and molasses in the field, without the necessity of transporting either the raw sugar cane or the extracted juices to a stationary mill for processing. The portable sugar mill is an all-electric unit that can be mounted on an 8'×42' flat-bed truck, a trailer, a wagon, or other portable platform. The truck includes a flat-bed frame and a forward deck. The forward deck includes a power source for the portable sugar mill processes. The flat-bed frame has an inlet side where extracted cane juice may be fed. The power source of the forward deck also includes a controller/generator connected to a fuel source.

Figure 1:
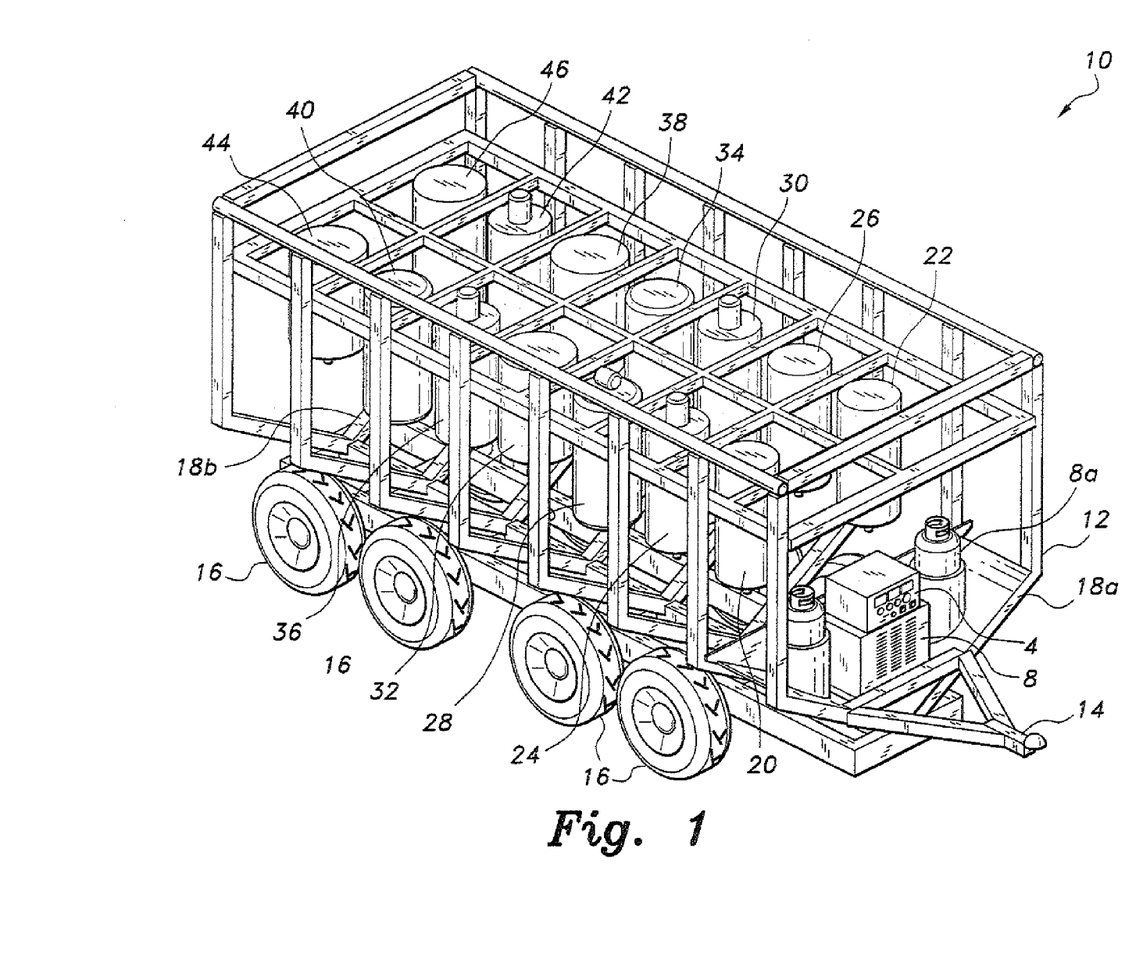
FIG. 1 is a perspective view of a portable sugar mill according to the present invention.
Figure 2:
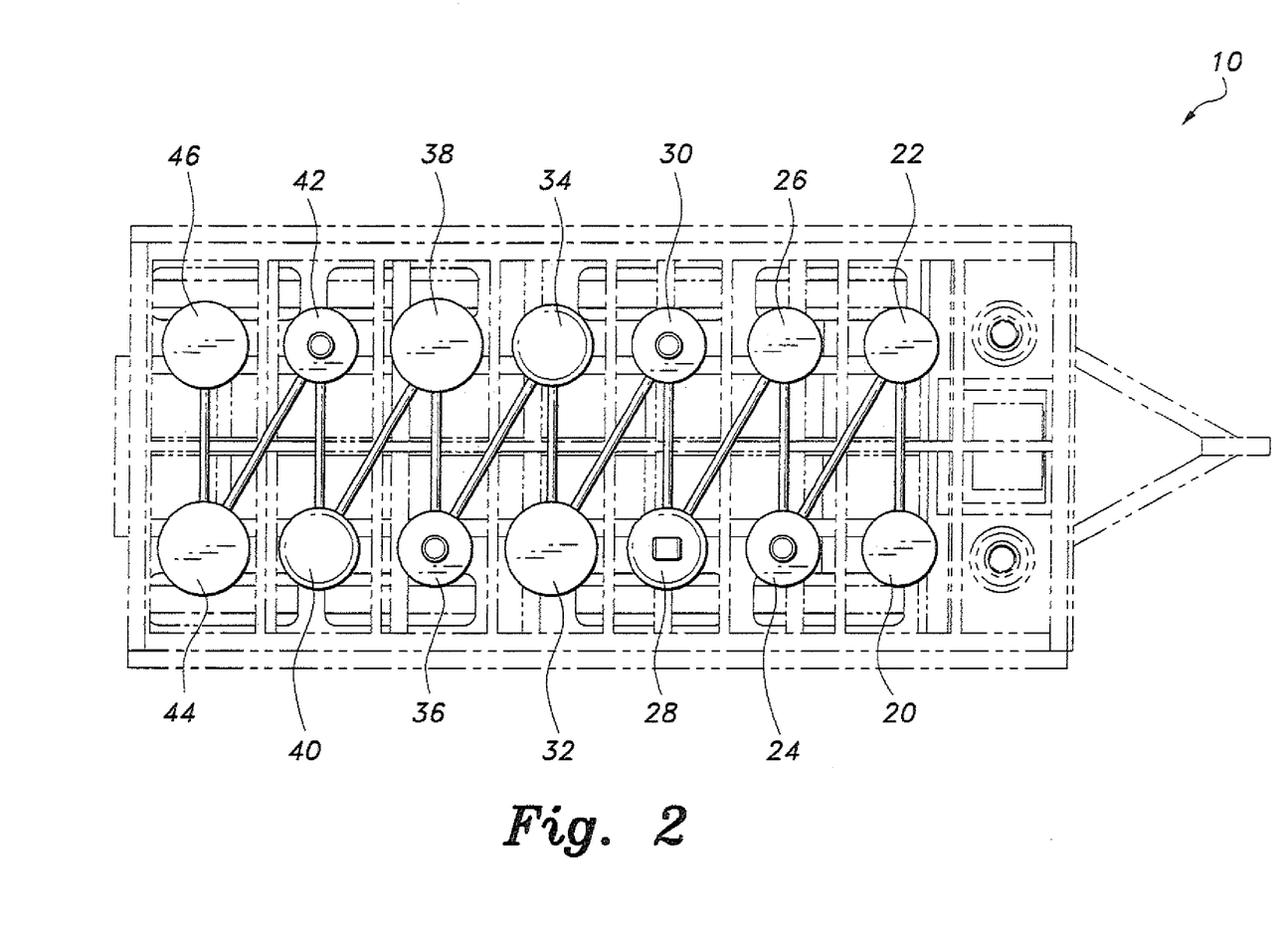
FIG. 2 is a top plan view of a portable sugar mill according to the present invention.

In FIGS. 1 and 2 the portable sugar mill 10 is shown mounted on a towable wagon or trailer 12 having a hitch member 14 for coupling to a towing vehicle (not shown). The trailer 12 is supported by a plurality of wheels 16. As mentioned above, the sugar mill 10 may also be mounted on a flat-bed truck.

The trailer 12 has a forward deck 18a and a main deck 18b. The forward deck 18a supports a power supply 8, and a system controller, such as a programmable logic controller 4. In addition, the power supply 8 has a fuel source 8a for operating the power supply to generate electricity. It is well understood that the power supply 8 and fuel source 8a may be a conventional generator powered by an internal combustion engine, or a generator powered by alternative fuels and/or power sources, such as fuel cells, batteries and/or solar panels.

The main deck 18b supports the processing system 10. The processing system 10 has a plurality of components to carry forth the process of refining raw sugar cane juice into crystallized sugar product and molasses. The components are provided in a sequential flow operation, as shown in FIGS. 4A through 4D, thereby carrying out a complete sugar refining plant process in the field.

The portable sugar mill 10 does not include rollers, mills, cutters, or other devices for extracting juice from sugar cane. Rather, the input to the portable sugar mill is juice that has already been extracted from sugar cane by an in-field extractor or by a portable extractor. The portable sugar mill 10 may be used in conjunction with a portable cane juice extractor, such as the device described in my previous patent, U.S. Pat. No. 7,918,160, issued Apr. 5, 2011 (the contents of which are hereby incorporated by reference in their entirety), which describes a portable device that extracts the raw juice from sugar cane on site. The portable sugar mill has a separator tank 20 that receives the sugar cane juice from the juice extraction device. The separator tank 20 has a float sensor that detects the liquid level in the tank 20, and an inlet valve that may be connected to the juice extractor by a pump hose or the like. A control relay connected to the programmable logic controller (PLC) 4 opens the valve and turns on a pump to draw the juice into the separator tank 20. The PLC closes the inlet valve under automatic control when the float tank is full. The juice is kept in the separator tank 20 for a period of time to allow solids to settle to the bottom of the tank 20. After the solids have settled, the PLC opens an outlet valve and turns on a pump that transfers the juice to a pre-heating tank (PHT) 22. Slaked lime (calcium hydroxide) is added to the liquid, which is heated to a predetermined temperature (preferably about 170° F.) by a heater under thermostatic control. The sugar mill 10 may have a dispenser containing the slaked lime, which includes a valve and a control relay operating under automatic control of the PLC 4 for dispensing a metered amount of the slaked lime into the pre-heating tank 22. The sucrose is then transferred from the PHT 22 to a clarifier tank 24, which agitates and mixes the warmed sucrose with a polymer (released into the tank 24 by a PLC-controlled valve) using a motor 24a that operates a stirrer. The lime destroys non-crystallizable invert sugars and amino acids in the clarifier tank 24, and the polymer helps to flocculate impurities. The clarified juice is transferred to a clarified sucrose holding tank 26 by PLC-controlled inlet and float valve(s) and pump(s). The holding tank 26 maintains the clarified juice at a predetermined temperature (preferably 170° F.) using another heater under thermostatic control.

The process continues with a first boiler 28, the first boiler 28 receives the clarified juice and boils off water to concentrate by evaporation under pressure. The pressure is applied by a vacuum pump 28a operated under control of the PLC 4, which applies a negative pressure of about −25 psi to the boiler 28. The operator adds seed crystals to the boiler 28 and views crystal growth through a sight glass in the boiler 28. When the crystals are of an appropriate size, the operator presses a stop button, which shuts off the heaters, opens an outlet valve, and activates a pump that transfers the partially crystallized juice to a first crystallizer 30. The FC 30 provides a stirring and cooling function to complete crystallization. The resulting mix of crystals and syrup, called massecuite, is transferred to a first centrifuge 32.

In the first centrifuge 32, the PLC 4 turns on a centrifuge motor that provides a spinning operation that causes separation of the syrup from the crystals. Upon completion of the separation by the first centrifuge 32, the syrup is transferred out of the first centrifuge 32 for further processing, while the crystalline solids that remain are stored in the first centrifuge 32, subsequently being removed by dumping the crystals into an auger system to a hopper for packaging as (A pan) sugar, or sent as bulk raw sugar to a refinery for further processing.

The syrup from the first centrifuge 32 is transferred to a second boiler 34. The second boiler 34 receives the syrup and boils the syrup under pressure to cause further evaporation of water from the syrup, seed crystals being added to initiate further crystallization. The output of the second boiler 34 is transferred a second crystallizer 36. The second crystallizer 36, like the first crystallizer 30, provides a stirring and cooling function to complete crystallization that produces a second massecuite, which is transferred to a second centrifuge 38.

The second centrifuge 38 provides another spinning operation that causes separation of the liquid portion of the massecuite from the solid or crystallized portion. Upon completion of the separation by second centrifuge 38, the liquid portion of the massecuite is transferred out of second centrifuge 38 for further processing, while the crystalline solids (B pan sugar) that remain are removed and transferred to the syrup entering the first boiler 28.

The syrup from second centrifuge 38 is transferred to a third boiler 40. The third boiler 40 receives the syrup and boils the syrup under pressure to cause still further evaporation of water from the syrup and initiate further crystallization. The output of the third boiler 40 is transferred to a third crystallizer 42. The third crystallizer 42 provides stirring and cooling to complete crystallization. The resulting third stage massecuite is transferred to a third centrifuge 44. Crystals (pan C sugar) that drop out of the third centrifuge 44 are added to the syrup entering the second boiler 34. The syrup left over from the third centrifuge 44 is transferred to a holding tank 46. The content of the holding tank 46 is blackstrap molasses, which is sold as a sweetener for animal feed.

As seen in FIG. 2, and FIGS. 4A through 4D, a conduit system 50 is provided between each portion of the processing of the portable sugar mill 10. Also included in the conduit system 50 are a plurality of pumps 52 for pumping the sucrose/massecuite through the different stages of the milling process.

Figure 3:
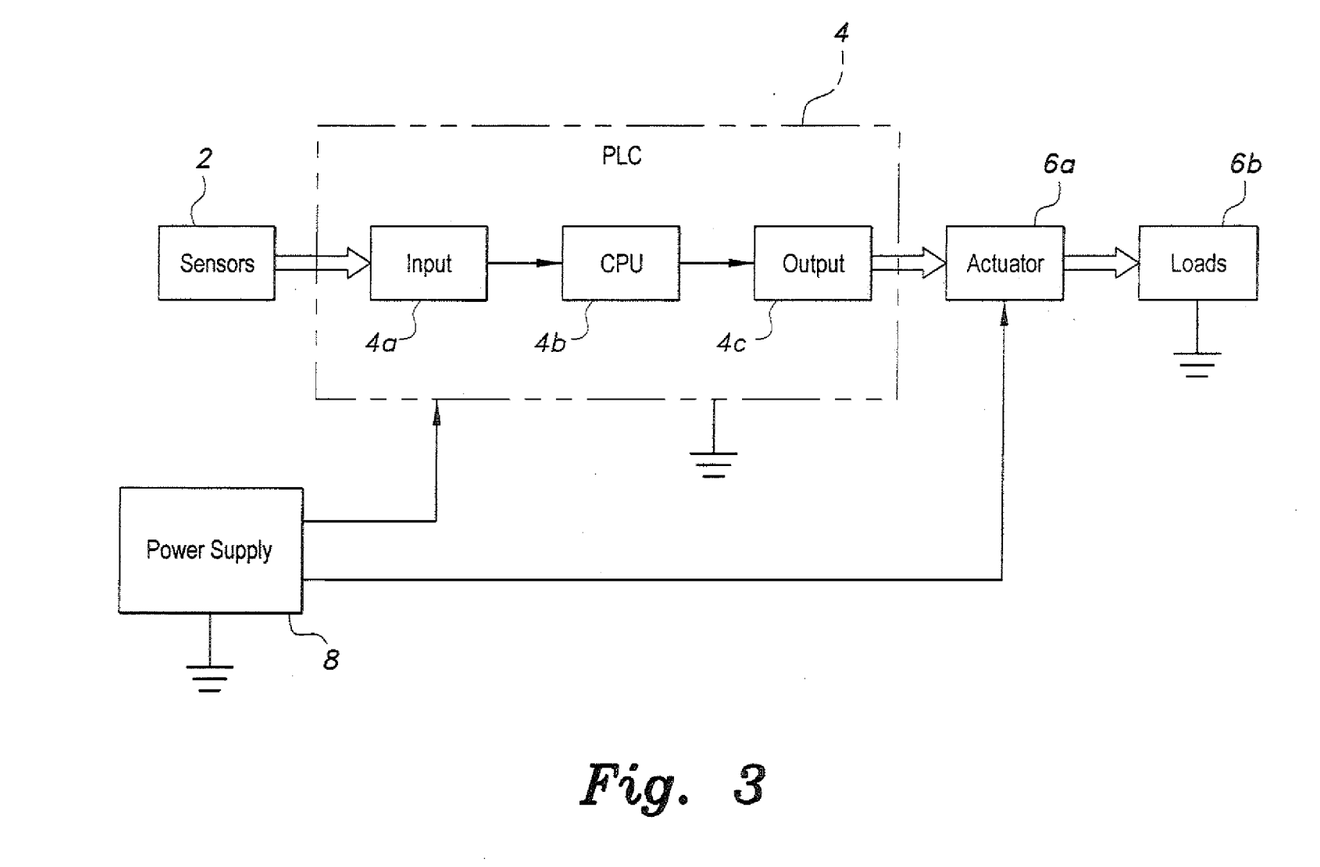
FIG. 3 is a block diagram of the control system of a portable sugar mill according to the present invention.

FIG. 3 shows the basic function of the control segment of the system 10. Throughout the system there are several transducers and/or sensors 2, for providing information or data to be processed. The sensors 2 include volume level (such as float sensors within each of the tanks) sensors, temperature sensors, valve position sensors, as well as a myriad of other types of transducers to indicate an instantaneous operational status to the programmable logic controller 4.

Taking FIG. 3 in conjunction with FIGS. 4A through 4D, more details of each of the functioning components of system 10 is explained. Each tank (20-46) has at least one sensor 2 associated with it for providing state information or data to the programmable logic controller 4. The programmable logic controller 4 receives the state information or data at an input 4a, the input 4a presents the data to the central processor unit (CPU) 4b or microcontroller. The CPU 4b includes computation, memory, look-up registers, etc. (all not shown, but well known in the art). The CPU 4b determines the next operation to be completed, based upon the received data from input 4a. The CPU 4b initiates instructional signals via an output 4c to an actuator 6a (e.g., control relays). The actuator 6a receives the instructional signals from output 4c, and sends the instruction to the corresponding load 6b (pumps, valves, motors, etc.). In addition, the power supply 8 generates the operational power for the programmable logic controller 4, the actuator 6a, and loads 6b. The loads 6b are the various portions of each of tanks (20-46), that are controlled by the programmable logic controller 4, in the processing of the sucrose/massecuite into sugar. The loads 6b include heating elements, motors, valves, pumps, etc.

Figure 4A:
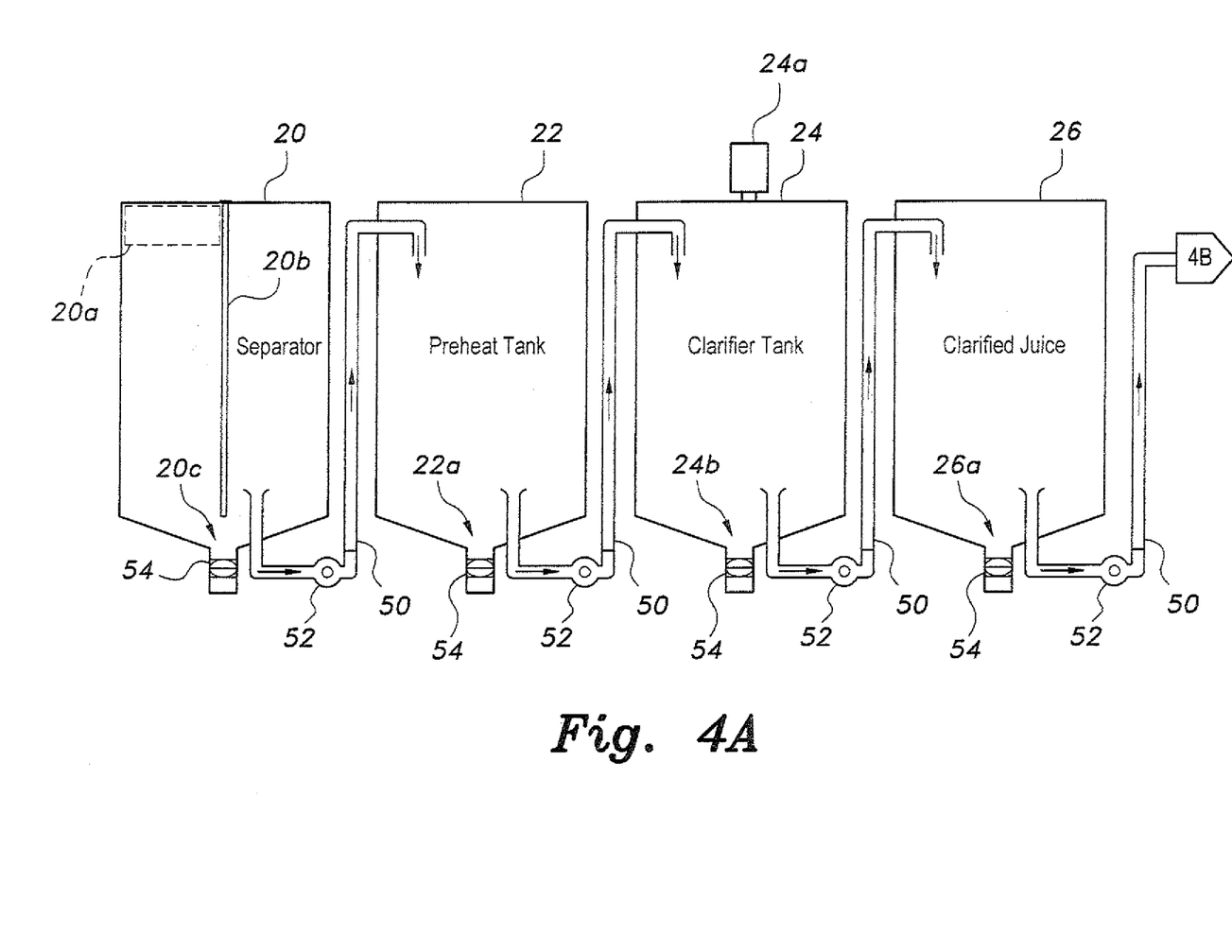
FIGS. 4A, 4B, 4C, and 4D are a block diagram of the process stages of a portable sugar mill according to the present invention.
Figure 4B:
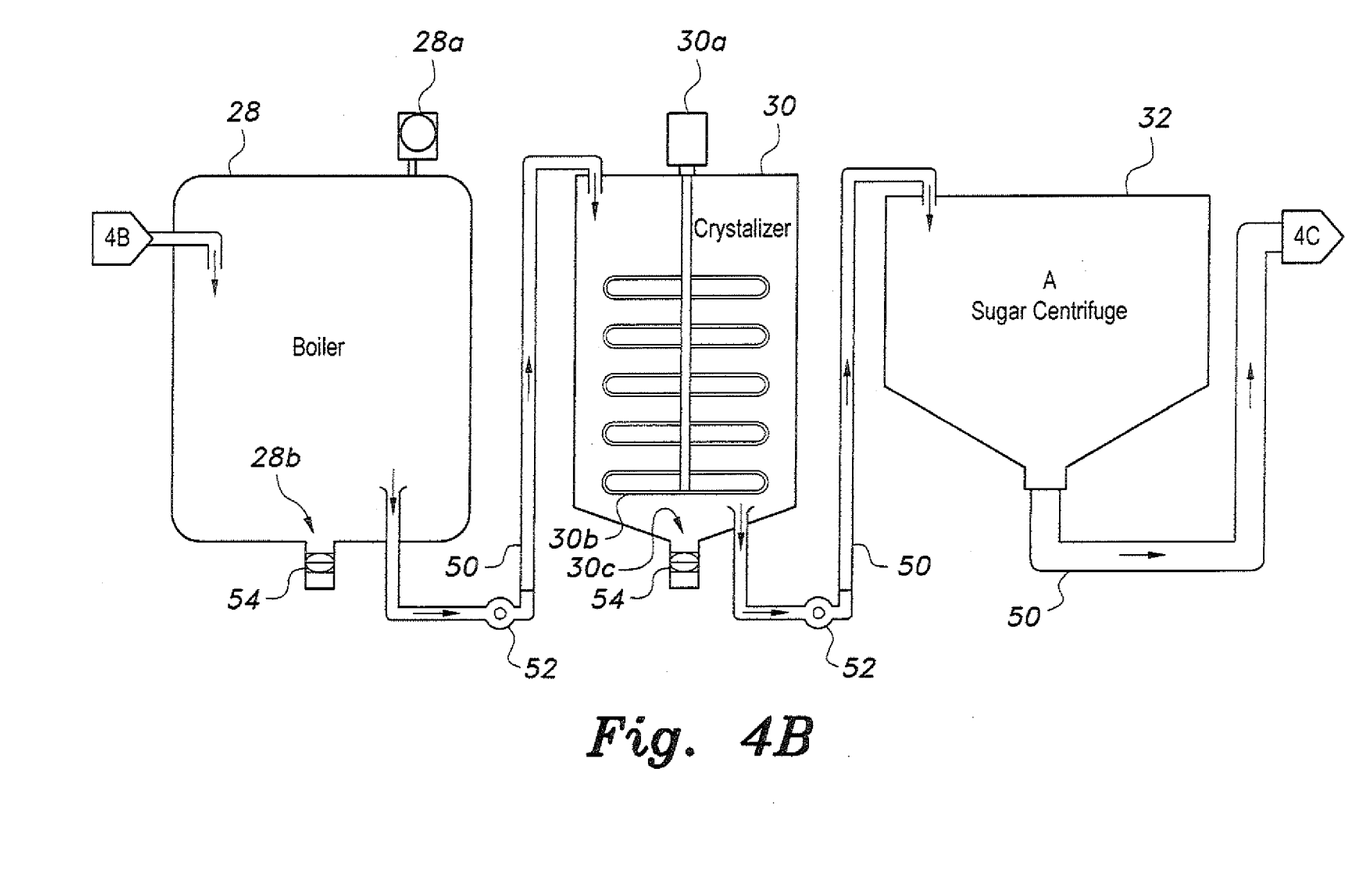
Figure 4C:
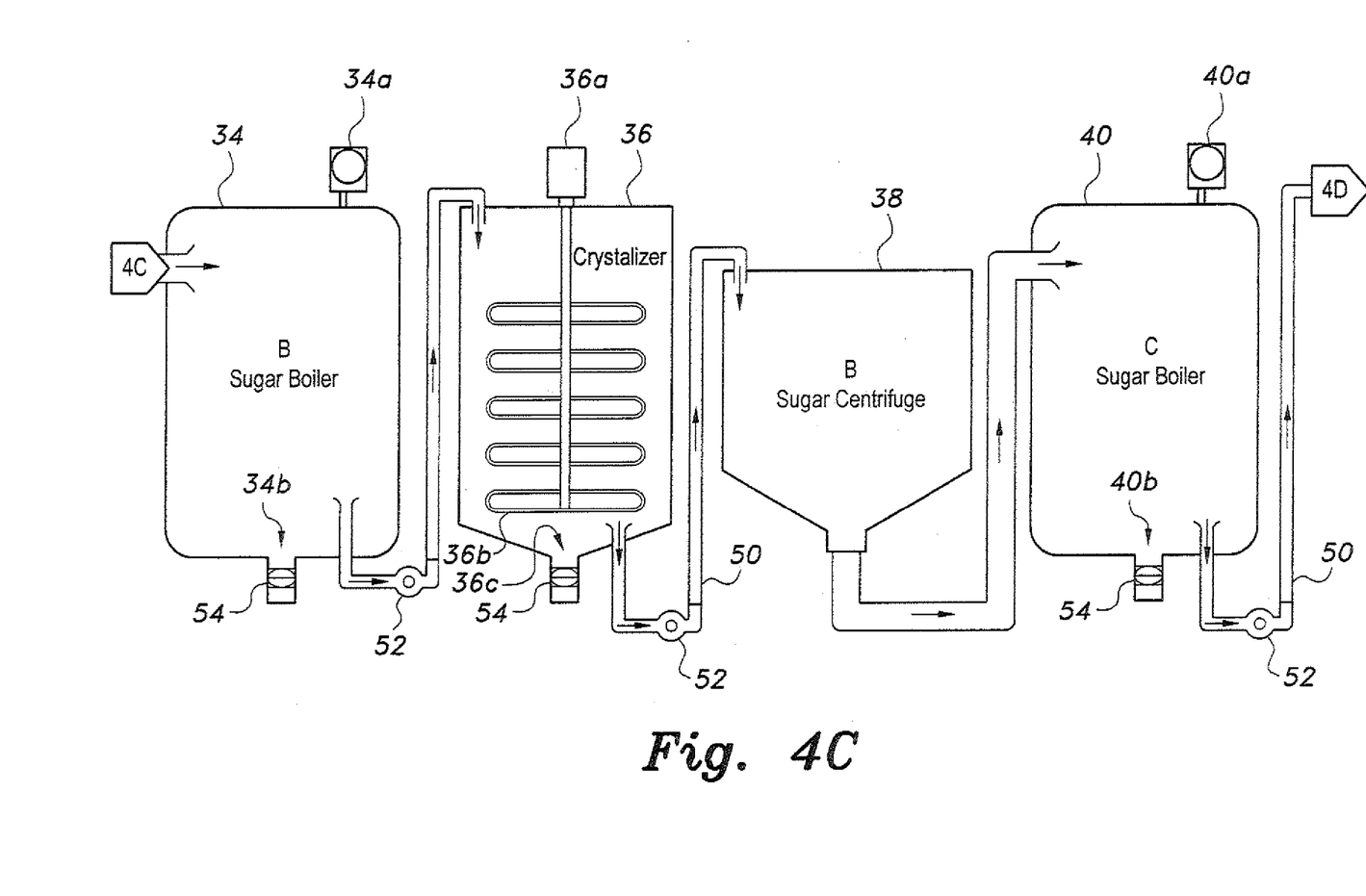
Figure 4D:
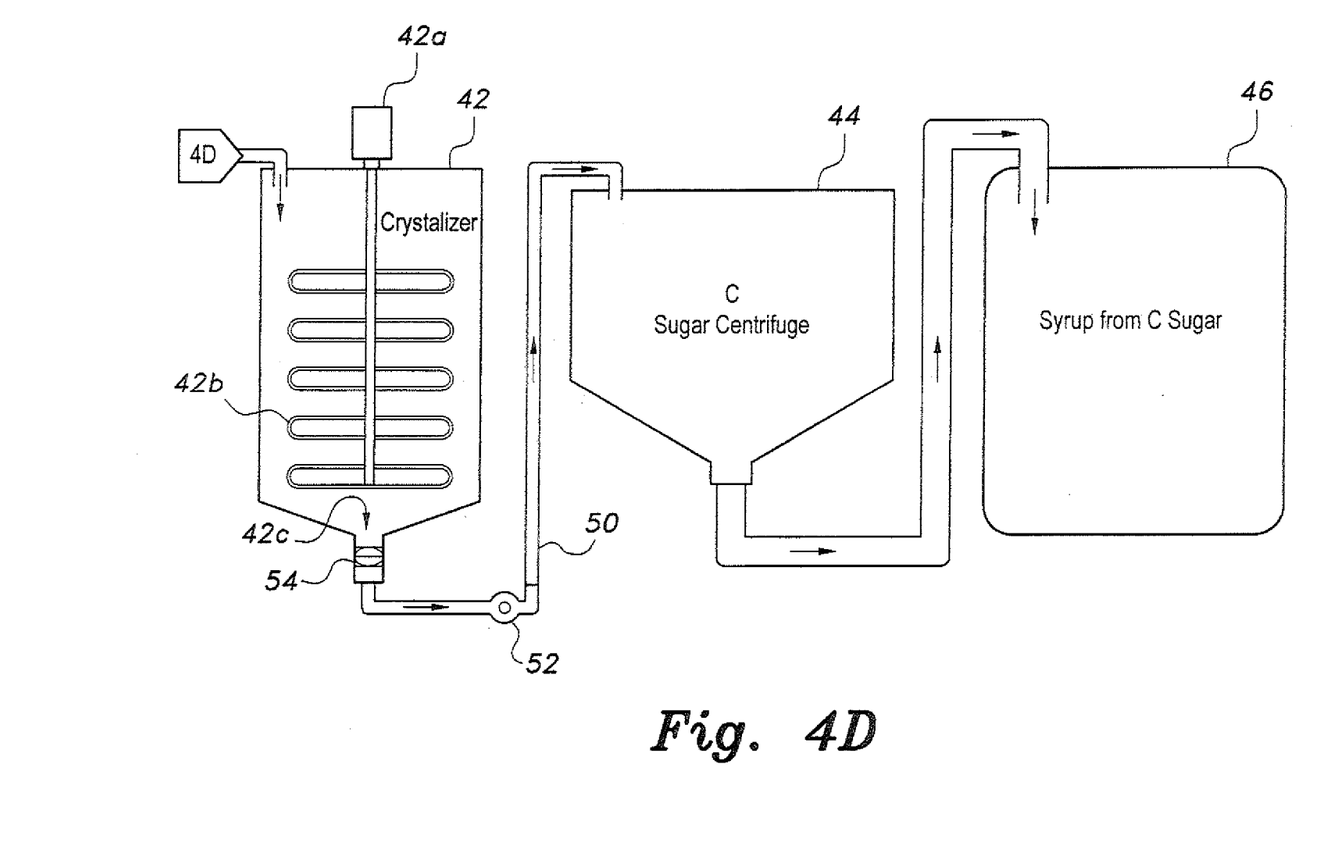

Referring to FIG. 4A, separation tank 20 has, at an inlet, a first filter 20a, for removing large and fibrous debris found in the sugar cane juice or sucrose from the aforementioned cane juice extractor. The separator tank 20 also has a sediment removal trap and port 20c, and an outlet. The separator tank 20 has a vertically disposed weir for filtering floating, particulate matter or debris in the sucrose. The sediment removal trap and port 20c has a valve 54 for capturing any debris settling from the sucrose. The outlet is coupled to a portion of the conduit system 50, and one of the pumps 52 for moving the juice from the separator tank 20.

The similar portions of each of the tanks (20-46), such as the sediment removal trap and port 22a, 24b, 26a, 28b, 30c, 34b, 36c, 40b, 42 and valves 54 all function with the same purpose, to capture debris settling from the sucrose or massecuite, and after all of the sugar processing is completed, the valves 54 are opened to flush the sediment out of each tank. Likewise, each tank has an outlet coupling the tank to conduit system 50, and may include a pump 52. The conduit system 50 portion coupled to an outlet of one tank, will direct the sucrose or massecuite to an inlet of the successive tank. All of the pumps 52 and valves 54 act in accordance with instructional signals from an actuator 6a, since the operation of the pumps 52 and valves 54 are included in the loads 6b.

The pre-heater tank 22 has a sediment removal trap and port 22a and a heater. The clarifier tank 24 has a sediment removal trap and port 24b, and a motor 24a coupled to an agitator (not shown) for agitation of the pre-heated sucrose, causing a mixing operation of a polymer introduced in the clarifier tank 24. The holding tank 26 maintains the clarified sucrose at the pre-heated temperature via a heater. Upon activation from the programmable logic controller 4, the clarified sucrose is pumped into the first boiler 28. The first boiler 28 has a heater for raising the temperature of clarified sucrose to a water boiling point, under pressure. The first boiler 28 has a vacuum pump 28a for exhausting the water vapor expelled from the boiling operation. The vacuum pump 28a is under the control of the programmable logic controller 4 via the actuator 6a as one of the loads 6b. Likewise, the second boiler 34 and the third boiler 40 have the corresponding parts and functions the second boiler has vacuum pump 34a; the third boiler 40 has vacuum pump 40a. Also included are the operations of the similar loads 6b in the second boiler 34 and the third boiler 40.

Regarding the first centrifuge 32, the second centrifuge 38, and the third centrifuge 44, each are one of the loads 6b under actuation by instructional signals from the programmable logic controller 4 via an actuator 6a. Similarly, the crystallizer tank 30, the second crystallizer 36, and the third crystallizer 42 function in accordance with the same mode of operation. The crystallizer tank 30 has a motor 30a and a stirrer 30b. The stirrer 30b is driven by the motor 30a to stir the massecuite. The motor 30a is one of the loads 6b under actuation by instructional signals from the programmable logic controller 4 via an actuator 6a. Furthermore, the second crystallizer 36 has a motor 36a, and a stirrer 36b. The stirrer 36b is driven by the motor 36a to stir the massecuite. The motor 36a is one of the loads 6b under actuation by instructional signals from the programmable logic controller 4 via actuator 6a. In addition, the third crystallizer 42 has a motor 42a and a stirrer 42b. The stirrer 42b is driven by the motor 42a to stir the massecuite. The motor 42a is one of the loads 6b under actuation by instructional signals from the programmable logic controller 4 via an actuator 6a.

Under the instructions of the output 4c of the programmable logic controller 4, the operational process follows a flow provided by the system 10. The flow process basically follows a sequence of functions described above. Thus, the portable sugar mill saves the cost of transporting the juice to stationary sugar mills, and produces a fresher product.

It is to be understood that the present invention is not limited to the embodiments described above, but encompasses any and all embodiments within the scope of the following claims.

I claim:

1. A portable sugar mill, comprising:
a mobile platform, the mobile platform including a main deck and a forward deck;
a multi-stage processing plant disposed upon the mobile platform main deck and adapted for receiving juice extracted from sugar cane and converting the juice to raw sugar and molasses, the multi-stage processing plant including a plurality of evaporative crystallization and separator stages connected in series;
a controller, the controller being located on the forward deck and includes a power supply to generate electricity, the controller further being connected to the multi-stage processing plant for automatically controlling progression between the processing stages;
wherein the controller comprises a programmable logic controller;
wherein the multi-stage processing plant comprises a clarification stage having;
a separator tank having a screen filter, the separator tank being adapted for receiving the juice from a sugar cane juice extractor;
a pre-heating tank;
a clarifier tank having a motor adapted for driving an agitator;
a holding tank adapted for holding the pre-heated and clarified juice, wherein float sensors are disposed in each of the tanks, the float sensors being connected to the programmable logic controller and configured for sensing liquid level of the juice in each of the tanks and sending a signal corresponding to the liquid level to the programmable logic controller; and
a plurality of pump and conduit assemblies connecting the separator tank to the pre-heating tank, the pre-heating tank to the clarifier tank, and the clarifier tank to the holding tank in series, the pumps being connected to the programmable logic controller, the programmable logic controller being programmed to activate the pumps to:
transfer the juice from the separator tank to the pre-heating tank after solids have settled out of the juice;
transfer the juice from the pre-heating tank to the clarifier tank after pre-heating the juice; and
transfer the pre-heated and clarified juice from the clarifier to the holding tank after clarification, the method comprising the steps of:
transporting a portable sugar mill to a sugar cane extractor adjacent a sugar cane field;
pumping juice extracted from sugar cane by the sugar cane extractor from the extractor into a separator tank of the portable sugar mill;
allowing solids to settle out of the juice in the separator tank;
transferring the juice to a pre-heating tank of the sugar mill;
adding slaked lime to the juice in the pre-heating tank;
heating the juice and slaked lime to about 170° F. in the pre-heating tank;
transferring the preheated juice to a clarifier tank of the sugar mill;
agitating the juice in the clarifier tank;
transferring the clarified, pre-heated juice to a holding tank in the portable sugar mill;
subjecting the pre-heated juice to three successive stages of evaporative crystallization and separation in the portable sugar mill, each of the stages involving:
boiling the juice in a boiler under negative pressure of about −25 psi;
seeding the juice with sugar crystals in the boiler;
transferring the juice to a crystallizer tank when crystals of appropriate size form;
stirring and cooling the juice in the crystallizer to form a massecuite;
separating sugar crystals from the massecuite in a centrifuge, leaving a syrup;
packaging sugar crystals separated in the first evaporative crystallization and separation stage for sale as raw sugar;
adding sugar crystals separated in the second and third stages of evaporative crystallization and separation to the boiler juice of the first and second stages, respectively;
selling syrup separated in the third stage of evaporative crystallization and separation as molasses for addition to animal feed;

continuing processing of juice from the extractor until the juice is exhausted.

2. The portable sugar mill according to claim 1, wherein said mobile platform comprises a flat-bed truck.

3. The portable sugar mill according to claim 1, wherein said mobile platform comprises a flat-bed trailer having a trailer tongue adapted for attachment to a towing vehicle.

4. The portable sugar mill according to claim 1, wherein said mobile platform comprises a wagon having a flat bed and a trailer tongue adapted for attachment to a towing vehicle.

5. The portable sugar mill according to claim 1, wherein each of said tanks has a sediment port having a control valve connected to said programmable logic controller.

6. The portable sugar mill according to claim 1, wherein said plurality of evaporative crystallization and separator stages comprises:
   a pan A evaporative crystallization and separator stage connected to said holding tank, the pan A evaporative crystallization and separator stages having:
   a first boiler tank having a vacuum pump attached thereto, the vacuum pump being connected to said programmable logic controller;
   a crystallizer tank having a motor and stirrer assembly, the motor being connected to said programmable logic controller, the crystallizer tank producing a first stage massecuite;
   a centrifuge configured for separating raw sugar crystals from the massecuite and storing the sugar crystals, leaving a syrup, the centrifuge having a motor connected to said programmable logic controller;
   a pump and conduit assembly connecting said holding tank to the first boiler, the pump being connected to said programmable logic controller; and
   a plurality of pump and conduit assemblies connecting the first boiler to the crystallizer tank, and the crystallizer tank to the centrifuge in series, the pumps being connected to said programmable logic controller, said programmable logic controller being programmed to activate the pumps to:
   activate said vacuum pump to place the first boiler under negative pressure after the sugar crystals have attained sufficient size;
   transfer the juice from the holding tank to the first boiler;
   transfer the juice from the first boiler to the crystallizer tank for cooling the juice to form the first stage massecuite; and
   transfer the massecuite from the crystallizer tank to the centrifuge, said programmable logic controller being programmed to activate the motor and stirrer assembly and the centrifuge motor.

7. The portable sugar mill according to claim 6, wherein said plurality of evaporative crystallization and separator stages further comprises:
   a pan B evaporative crystallization and separator stage connected to said pan A centrifuge, the pan B evaporative crystallization and separator stages having:
   a second boiler tank having a vacuum pump attached thereto, the vacuum pump being connected to said programmable logic controller;
   a crystallizer tank having a motor and stirrer assembly, the motor being connected to said programmable logic controller, the crystallizer tank producing a second stage massecuite;
   a centrifuge configured for separating raw sugar crystals from the second stage massecuite, leaving a syrup, the centrifuge having a motor connected to said programmable logic controller;
   a pump and conduit assembly connecting said pan A centrifuge to the second boiler, the pump being connected to said programmable logic controller; and
   a plurality of pump and conduit assemblies connecting the second boiler to the pan B crystallizer tank, and the pan B crystallizer tank to the pan B centrifuge in series, the pumps being connected to said programmable logic controller, said programmable logic controller being programmed to activate the pumps to:
   activate said vacuum pump to place the second boiler under negative pressure after the sugar crystals have attained sufficient size;
   transfer the juice from the second boiler to the pan B crystallizer tank for cooling the juice to form the second stage massecuite; and
   transfer the second stage massecuite from the pan B crystallizer tank to the pan B centrifuge, said programmable logic controller being programmed to activate the pan B motor and stirrer assembly and the pan B centrifuge motor.

8. The portable sugar mill according to claim 7, wherein said plurality of evaporative crystallization and separator stages further comprises:
   a pan C evaporative crystallization and separator stage connected to said pan B centrifuge, the pan C evaporative crystallization and separator stages having:
   a third boiler tank having a vacuum pump attached thereto, the vacuum pump being connected to said programmable logic controller;
   a crystallizer tank having a motor and stirrer assembly, the motor being connected to said programmable logic controller, the crystallizer tank producing a third stage massecuite;
   a centrifuge configured for separating raw sugar crystals from the third stage massecuite, leaving molasses, the centrifuge having a motor connected to said programmable logic controller;
   a holding tank for the molasses;
   a pump and conduit assembly connecting said pan B centrifuge to the third boiler, the pump being connected to said programmable logic controller; and
   a plurality of pump and conduit assemblies connecting the third boiler to the pan C crystallizer tank, the pan C crystallizer tank to the pan C centrifuge, and the pan C centrifuge to the pan C holding tank in series, the pumps being connected to said programmable logic controller, said programmable logic controller being programmed to activate the pumps to:
   activate said vacuum pump to place the third boiler under negative pressure after the sugar crystals have attained sufficient size;
   transfer the juice from the third boiler to the pan C crystallizer tank for cooling the juice to form the third stage massecuite;
   transfer the third stage massecuite from the pan C crystallizer tank to the pan C centrifuge; and
   transfer the molasses from the pan C centrifuge to the pan C holding tank, said programmable logic controller being programmed to activate the pan C motor and stirrer assembly and the pan C centrifuge motor.

9. The portable sugar mill according to claim 7, further comprising a plurality of temperature sensors connected to said programmable logic controller.

10. A method of processing sugar cane extract with a portable sugar mill, the portable sugar mill comprising:
   a mobile platform, the mobile platform including a main deck and a forward deck;

a multi-stage processing plant disposed upon the mobile platform main deck and adapted for receiving juice extracted from sugar cane and converting the juice to raw sugar and molasses, the multi-stage processing plant including a plurality of evaporative crystallization and separator stages connected in series;

a controller, the controller being located on the forward deck and includes a power supply to generate electricity, the controller further being connected to the multi-stage processing plant for automatically controlling progression between the processing stages:

wherein the controller comprises a programmable logic controller;

wherein the multi-stage processing plant comprises a clarification stage having;

a separator tank having a screen filter, the separator tank being adapted for receiving the juice from a sugar cane juice extractor;

a pre-heating tank;

a clarifier tank having a motor adapted for driving an agitator;

a holding tank adapted for holding the pre-heated and clarified juice, wherein float sensors are disposed in each of the tanks, the float sensors being connected to the programmable logic controller and configured for sensing liquid level of the juice in each of the tanks and sending a signal corresponding to the liquid level to the programmable logic controller; and a plurality of pump and conduit assemblies connecting the separator tank to the pre-heating tank, the pre-heating tank to the clarifier tank, and the clarifier tank to the holding tank in series, the pumps being connected to the programmable logic controller, the programmable logic controller being programmed to activate the pumps to:

transfer the juice from the separator tank to the pre-heating tank after solids have settled out of the juice;

transfer the juice from the pre-heating tank to the clarifier tank after pre-heating the juice; and transfer the pre-heated and clarified juice from the clarifier to the holding tank after clarification, the method comprising the steps of:

transporting a portable sugar mill to a sugar cane extractor adjacent a sugar cane field;

pumping juice extracted from sugar cane by the sugar cane extractor from the extractor into a separator tank of the portable sugar mill;

allowing solids to settle out of the juice in the separator tank;

transferring the juice to a pre-heating tank of the sugar mill;

adding slaked lime to the juice in the pre-heating tank;

heating the juice and slaked lime to about 170° F. in the pre-heating tank;

transferring the preheated juice to a clarifier tank of the sugar mill;

agitating the juice in the clarifier tank;

transferring the clarified, pre-heated juice to a holding tank in the portable sugar mill;

subjecting the pre-heated juice to three successive stages of evaporative crystallization and separation in the portable sugar mill, each of the stages involving:

boiling the juice in a boiler under negative pressure of about −25 psi;

seeding the juice with sugar crystals in the boiler;

transferring the juice to a crystallizer tank when crystals of appropriate size form;

stirring and cooling the juice in the crystallizer to form a massecuite;

separating sugar crystals from the massecuite in a centrifuge, leaving a syrup;

packaging sugar crystals separated in the first evaporative crystallization and separation stage for sale as raw sugar;

adding sugar crystals separated in the second and third stages of evaporative crystallization and separation to the boiler juice of the first and second stages, respectively;

selling syrup separated in the third stage of evaporative crystallization and separation as molasses for addition to animal feed;

continuing processing of juice from the extractor until the juice is exhausted.

11. The method of processing sugar cane extract with a portable sugar mill according to claim 10, wherein processing in the portable sugar mill is conducted automatically under control of a programmable logic controller.

* * * * *